(12) United States Patent
Babiarz et al.

(10) Patent No.: US 6,200,617 B1
(45) Date of Patent: Mar. 13, 2001

(54) METHOD OF MAKING A TACKED COILED FOOD PRODUCT

(75) Inventors: David E. Babiarz, Inverness; Ronald T. Cappadocia, Libertyville; William E. Lundgren, Jr., Naperville, all of IL (US)

(73) Assignee: Van Melle USA Inc., Buffalo Grove, IL (US)

( * ) Notice: Subject to any disclaimer, the term of this patent is extended or adjusted under 35 U.S.C. 154(b) by 0 days.

(21) Appl. No.: 09/502,140

(22) Filed: Feb. 11, 2000

Related U.S. Application Data

(60) Provisional application No. 60/158,456, filed on Oct. 8, 1999.

(51) Int. Cl.⁷ .................................................. A23G 3/00
(52) U.S. Cl. ...................... 426/297; 426/96; 426/106; 426/115; 426/289; 426/660
(58) Field of Search ............... 426/96, 106, 289, 426/297, 115, 660, 5

(56) References Cited

U.S. PATENT DOCUMENTS

| | | | |
|---|---|---|---|
| 2,305,712 | * 12/1942 | Kaefer | 426/501 |
| 2,373,012 | * 4/1945 | Burdett et al. | 426/501 |
| 2,635,965 | 4/1953 | Hensgen et al. | 99/171 |
| 2,726,156 | * 12/1955 | Armstrong | 426/501 X |
| 2,758,710 | * 8/1956 | Arens | 426/115 X |
| 2,760,871 | 8/1956 | Hensgen et al. | 99/171 |
| 2,800,862 | * 7/1957 | Hansen | 426/501 X |
| 2,830,910 | * 4/1958 | Swanson | 426/115 |
| 3,107,651 | * 10/1963 | Beck | 426/104 X |
| 3,156,194 | * 11/1964 | Scott | 426/501 |
| 3,172,372 | * 3/1965 | Packman | 426/501 |
| 3,225,717 | * 12/1965 | Page | 426/501 |
| 3,524,401 | * 8/1970 | Hosfield et al. | 426/501 X |
| 3,669,007 | 6/1972 | Pulici | 99/450.6 |
| 4,110,482 | * 8/1978 | Sato | 426/501 X |
| 4,882,175 | * 11/1989 | Ream et al. | 426/514 X |
| 5,133,980 | * 7/1992 | Ream et al. | 426/115 |
| 5,205,106 | 4/1993 | Zimmermann et al. | 53/118 |
| 5,284,667 | 2/1994 | Zimmermann et al. | 426/420 |
| 5,455,053 | 10/1995 | Zimmermann et al. | 426/106 |
| 5,516,542 | 5/1996 | Zimmermann et al. | 426/420 |
| 5,538,742 | * 7/1996 | McHale et al. | 425/5 |
| 5,723,163 | 3/1998 | Zimmermann et al. | 426/106 |
| 5,846,588 | 12/1998 | Zimmermann et al. | 426/420 |
| 5,876,777 | 3/1999 | Zimmermann et al. | 426/420 |

OTHER PUBLICATIONS

Comack press release regarding "Packaging Gum Mass," dated Aug. 1991.

* cited by examiner

*Primary Examiner*—Milton Cano
(74) *Attorney, Agent, or Firm*—Frost Brown Todd LLC

(57) ABSTRACT

A food item and method of fabrication is disclosed wherein the food item is packaged in a manner promoting marketability. The food item includes a fruit-based strip having a predetermined length defined by a leading end and a trailing end. The strip is rolled around its leading end into a roll having multiple rotations with an outer layer in contact with an inner layer. Further, a region of the outer layer proximate to the trailing end is attached to the inner layer of the roll.

15 Claims, 8 Drawing Sheets

| Materials | Percent | Weight | Dry Solids | % Solids | % D.E.D.S. | | |
|---|---|---|---|---|---|---|---|
| Corn Syrup 62 DE | 34.6600 | 103.9800 | 81.2000 | 84.4318 | 20.41 | | 300.0000 |
| Flour Wheat soft | 30.3800 | 91.1400 | 86.4000 | 78.7450 | | | |
| Sugar | 24.5200 | 73.5600 | 100.0000 | 73.5600 | | | |
| Fat (Soybean oil) | 2.4500 | 7.3500 | 0.0000 | 0.0000 | | | |
| CMC | 0.3000 | 0.9000 | 99.5000 | 0.8955 | | | |
| Acid citric | 1.5700 | 4.7100 | 99.5000 | 4.6865 | | | |
| Water | 5.0000 | 15.0000 | 0.0000 | 0.0000 | | | |
| Color | 0.0000 | 0.0000 | 0.0000 | 0.0000 | | | 3.5 MM |
| Flavor | 0.0000 | 0.0000 | 0.0000 | 0.0000 | Strawberry | | 4.5B MM |
| HFCS 55 (ADM) | 6.1200 | 18.3600 | 77.0000 | 14.1372 | 5.29 | | |
| Total | 105.0000 | 315.0000 | | 256.4559 | 25.70 | | |
| | | | %Solids | 81.4146 | | | |
| | | | Yield | 294.7769 | | | |
| | | | % Moisture | 18.5854 | | Before cooking | |
| | | Expected final moisture | 8%-9% | | | After cooking | |

Fig. 7

METHOD OF MAKING A TACKED COILED FOOD PRODUCT

RELATED APPLICATIONS

This Application claims the benefit of U.S. Provisional Patent Application Ser. No. 60/158,456, filed Oct. 8, 1999.

DESCRIPTION

1. Technical Field

The present invention generally relates to food items and methods of fabricating, and in particular to the packaging of a food material strip in a manner appealing to consumers.

2. Background of the Invention

The merchandising of snack-type food products is a highly competitive business. In addition to the particular type of food material within these products, the novelty and play value are also important factors to consumers when deciding whether to purchase the product.

For example, a snack product such as FRUIT ROLL-UPS has found wide market acceptance. This product comprises a dehydrated fruit-based strip of material that must be unrolled and peeled from the packaging. Although dehydrated fruit-based snacks are not new, the process of unrolling and peeling a strip of candy from its packaging is appealing to children and some adults.

SUMMARY OF THE INVENTION

The present invention is a food item and a method of fabricating wherein the food item is packaged in a manner promoting marketability. The food item includes a food material strip or belt having a predetermined length defined by a leading end and a trailing end. The strip is rolled around its leading end into a roll having multiple rotations with an outermost layer in contact with an inner layer. Furthermore, a region of the outermost layer proximate to the trailing end is tacked to the inner layer.

The food item can be manufactured by using a fork to coil the strip of food. Then, the outermost layer of the coil proximate to the trailing end of the strip can be tacked to an inner layer of the coiled strip.

BRIEF DESCRIPTION OF THE DRAWINGS

In the accompanying drawings forming part of the specification, and in which like numerals are employed to designate like parts throughout the same.

FIG. 7 is a table listing the preferred ingredients of the food material of FIG. 1;

DETAILED DESCRIPTION

Figure 1:
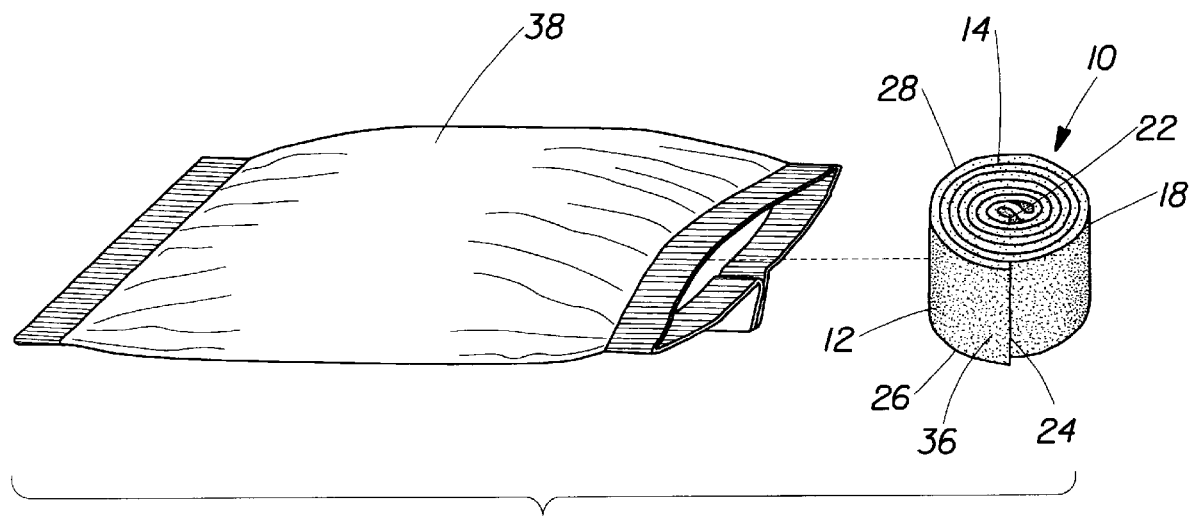
FIG. 1 is a perspective view of a food item in accordance with the present invention that has been removed from a bag and includes a tacked coiled strip of food material coated with sugar granules.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
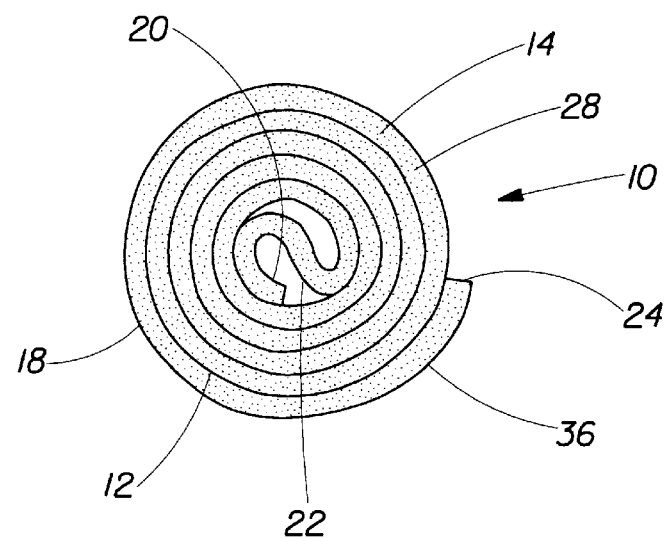
FIG. 2 is a side view of the coiled food item of FIG. 1.

Referring to FIGS. 1–2, a food item 10 in accordance with the present invention is depicted comprising a tacked coiled belt or strip 12 of food material 14 sanded or coated with sugar granules. The food strip 12 consists of candy or a like food substance such as a sour flavored food material comprising the ingredients shown in FIG. 7.

The food strip has two planar side surfaces 18, 20, a leading end 22, an opposite trailing end 24, and two parallel edges 26, 28 extending longitudinally. The length of the food strip 12 extends from the strip's leading end 22 to its trailing end 24. The width of the food strip 12 extends between the strip's parallel edges 26 and 28.

The strip of food material 12 is sanded or coated on both side surfaces 18, 20 with sugar or the like. The strip 12 is coiled multiple times around the leading end 22 to define a plurality of loops or layers in overlapping relationship. Each loop or layer has a side surface in contact with, and thus supported by, another side surface of the strip of food material 12.

In an embodiment, an end portion or region 36 of the strip 12 proximate to the trailing end 24 is attached by tacking to an inner layer of the strip to prevent uncoiling of the food item. Moreover, the coiled food item 10 can be enclosed within a sealed plastic bag 38 or the like to preserve the freshness of the food material.

Figure 3:
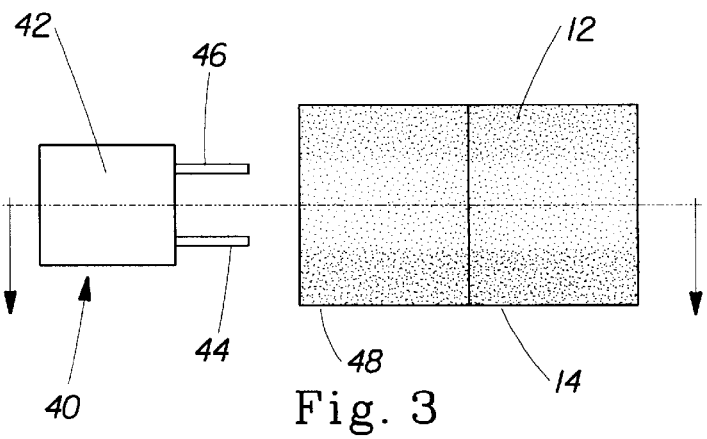
FIG. 3 is a top view of an embodiment of a tacking device along with the coiled food item of FIG. 1 prior to tacking.
Figure 4:
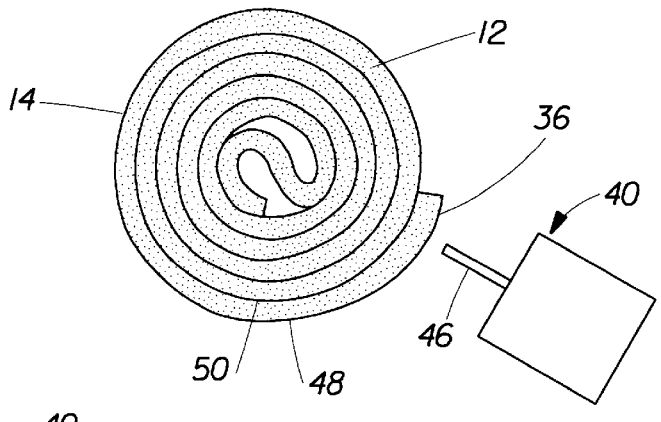
FIG. 4 is a cross sectional view of the food item shown in FIG. 3 taken along plane 4—4.
Figure 5:
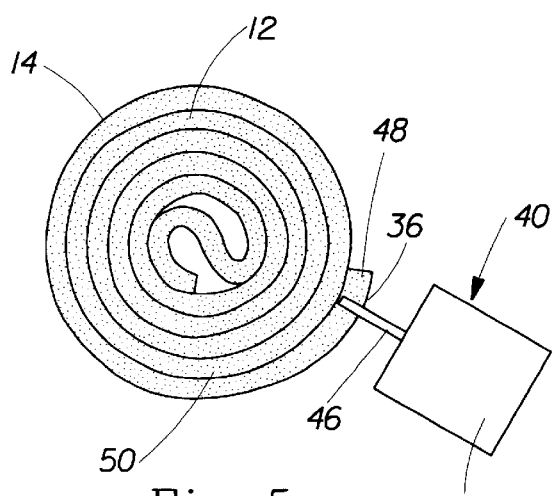
FIG. 5 is similar to FIG. 4, but with the tacking device injected into the coiled food item.

Turning to FIGS. 3–6, an embodiment of a method for fabricating a food item 10 in accordance with the present invention is depicted. As shown in FIGS. 3 and 4, prior to tacking the coiled strip 12 of food material 14, a tacking device 40 is provided having, in an embodiment, a heating element 42 and a pair of prongs or needles 44 and 46. The heating element 42 heats the needles 44, 46 to a predetermined temperature of, preferably, about 160 degrees Fahrenheit. The needles 44,46 are injected into the coiled strip 12 such that the needles 44, 46 penetrate the outermost layer 48 of the coil and also penetrate into an inner layer 50 adjoining the outermost layer as shown in FIG. 5.

Figure 6:
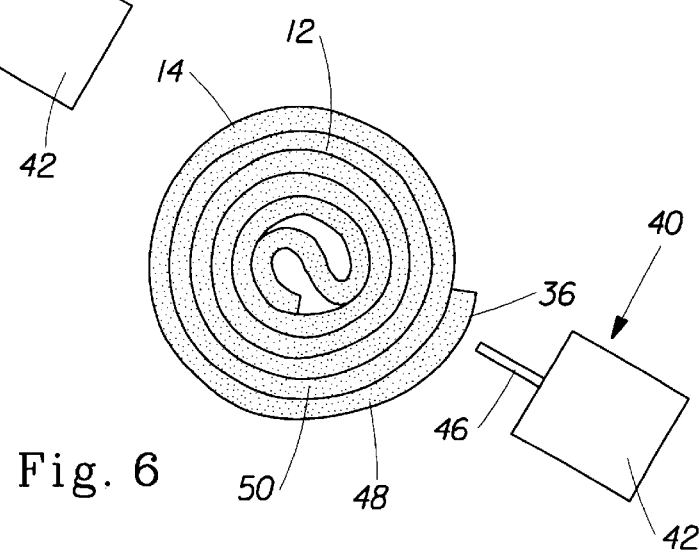
FIG. 6 is similar to FIG. 5, but with the tacking device withdrawn from the coiled food item.

The heating of the food material 14 about the needles 44, 46 tacks the associated portion 38 of the outermost layer 48 to the inner adjoining layer 50 of the coiled strip 12. Then, the needles 44, 46 are removed as shown in FIG. 6 and the coiled strip 12 can, if desired, be deposited into a bag 38 or the like.

In an alternative embodiment, the needles 44, 46 can be injected through multiple layers of the coiled strip 12. Further, only one needle can be used for tacking the coiled strip 12, or if desired, more than two needles.

Turning back to FIGS. 1–2, in another embodiment, the region 36 of the strip 12 proximate to the trailing end 24 is tacked or welded to the inner layer 50 of the strip 12 by pressing portions of the outermost layer 48 against portions of the inner layer. In this alternative embodiment, no heat is used to tack the layers together.

Figure 8:
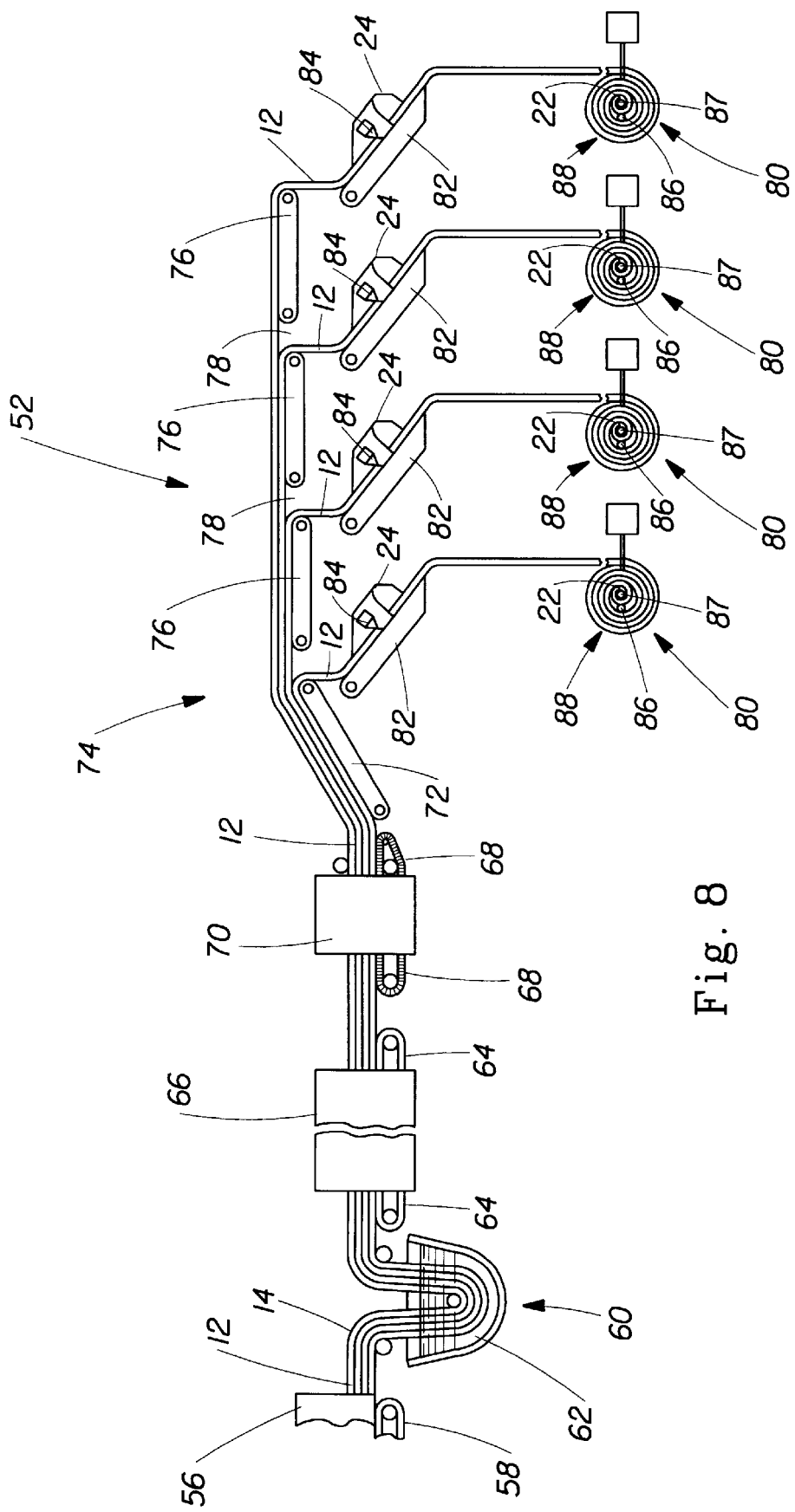
FIG. 8 is a schematic view of a fabrication system having a plurality of mechanisms for coiling and tacking strips of food material in accordance with the present invention.

FIG. 8 provides a schematic view of a fabrication system 52 having a plurality of mechanisms 80 for coiling and then tacking strips of food material by pressing portions of two layers together. The system 52 includes an extrusion head 56 for forming a plurality of spaced, parallel, narrow strips 12 of food material 14. The extrusion head 52 receives food material that is heated to an amorphous state allowing for even extrusion of the strips 12 of food material onto an endless conveyor belt 58.

The strips 12 of food material 14 are directed through a bath 60 of edible oil 62 and onto another endless conveyor belt 64 extending through a cooling tunnel 66. The oil, such as CAPOL or the like, preferably consists of a curing agent to keep acid in the strips 12. The temperature of the food material 14 is lowered as it passes through the cooling tunnel 66 for converting the food material 14 from an amorphous state to a pliable solid.

The strips 12 of food material exiting the cooling tunnel 66 are next directed onto an endless stainless steel wire mesh conveyor belt 68. The conveyor belt 68 extends through a conventional device, known in the art as a sander 70, for evenly spreading and pressing granules of sugar onto the strips 12. This process, known in the art as sanding, attaches the sugar granules to the outer surface of the strips 12.

The strips 12 of food material exiting the sander 70 are passed onto an inclined endless conveyor belt 72 for transporting the strips onto an elevated conveyor system 74 consisting of a plurality of elevated conveyors 76 separated from each other by a plurality of divides 78. Mounted below the elevated conveyor system 74 are a plurality of mechanisms or stations 80 for individually coiling and tacking the strips 12 of food material as explained in detail further herein.

As shown in FIG. 8, each strip 12 of food material is transferred from the elevated conveyor system 74 onto a respective inclined endless conveyor belt 82 wherein the strip is cut by a knife 84 to define the trailing or cut end 24 of the strip. The leading end 22 of each strip 12 is received between first and second spaced parallel legs or tines 86, 87 of a fork 88 associated with a corresponding coiling and tacking mechanism 80. The legs 86, 87 of each fork 88 preferably have a length at least equal to the transverse width of an individual strip 12 of food material 14.

Figure 9:
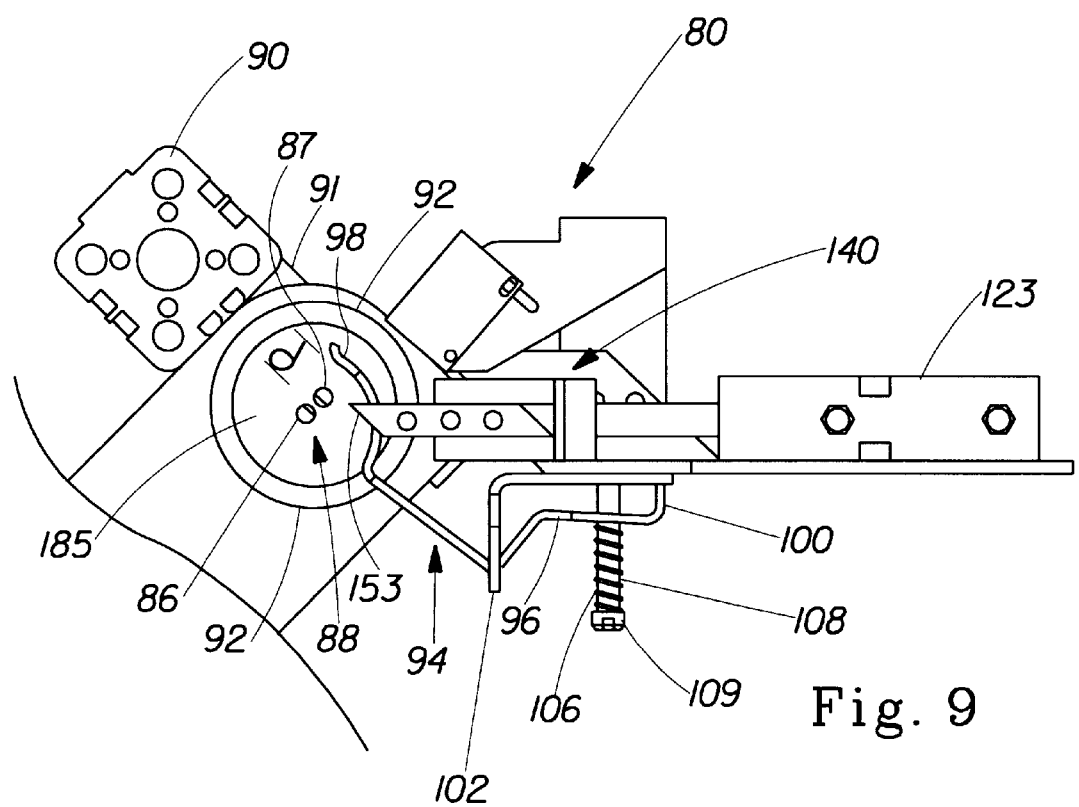
FIG. 9 is an elevated view of one of the coiling and tacking mechanisms of FIG. 8, before receiving a strip of food material, and having a fork, a tacking device and a sensor device.
Figure 11:
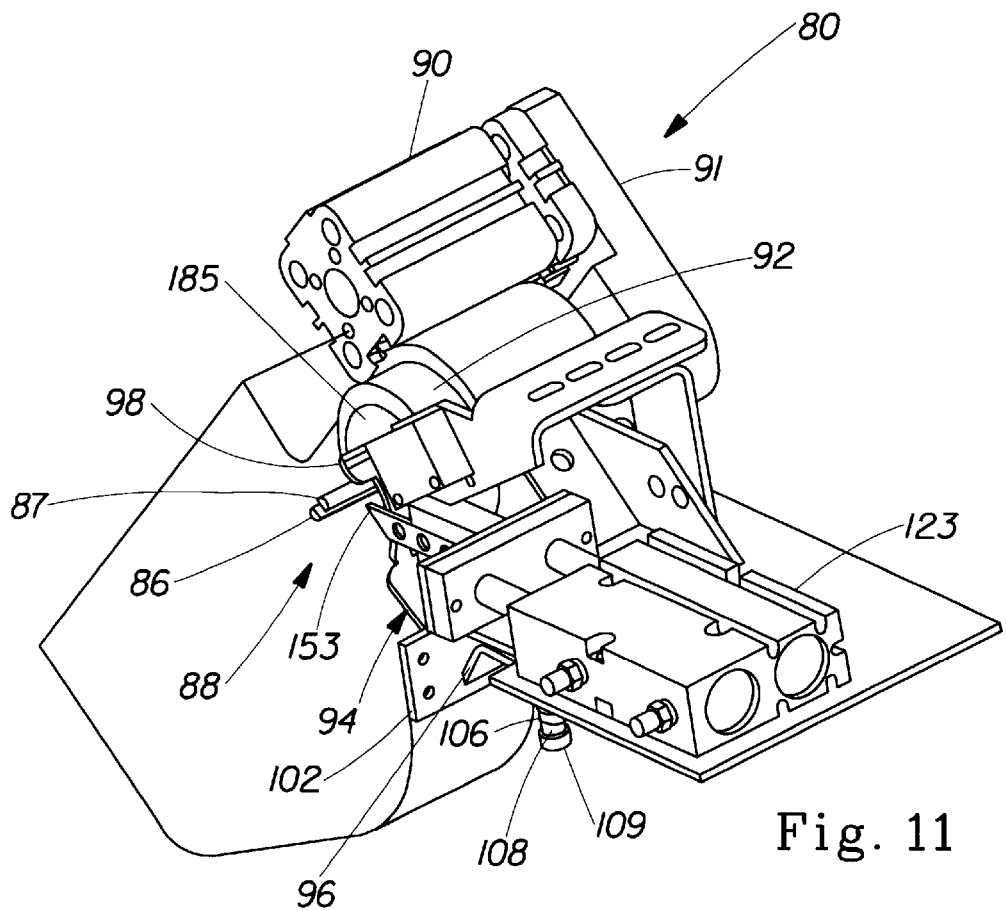
FIG. 11 is a perspective view of the coiling and tacking mechanism of FIG. 9.

Turning to FIGS. 9 and 11, the fork 88 of each coiling and tacking mechanism 80 is operably connected, via a shielded drive coupling 91, to a motor 90 for rotating the fork 88 about an axis located parallel to the legs 86, 87. Fork 88 is reciprocated between a first, engaged or extended position (FIGS. 9, 11–14) extending generally in line with the path of the strip 12 exiting the associated inclined conveyor belt 82 (FIG. 8), and a second, disengaged or retracted position (FIGS. 15 and 16) located to one side of the inclined conveyor 82 and transversely spaced from the first, engaged position. Preferably, fork 88 is reciprocated from the first and second positions, and vice versa, by a double-action pneumatic cylinder 92.

Each coiling and tacking mechanism 80 includes a pressure application device 94 for maintaining pressure against the food strip 12 as the strip is being coiled. Accordingly, the strip 12 is prevented from uncoiling by the pressure application device 94 before, and while, the coiled strip is being tacked. The pressure application device 94 preferably consists of a metal or metal alloy beam 96 having an arcuate end 98 and a bias member attachment end 100. The pressure application device 94 is pivotally coupled to a fixed intermediate member 102 to allow the beam 96 to pivot about the fixed member 102. The attachment end 100 of the beam 96 is coupled to a spring-load 104 comprising a spring 106 mounted about a shaft 108 having a distal end cap 109 attached thereto and in abutting relationship to the spring.

The arcuate end 98 of the pressure application device 94 reciprocates between a first inner position (FIGS. 9 and 12), wherein the arcuate end 98 is radially spaced by a predetermined distance "d" from the fork 88 in its extended position, and a second outer position (FIGS. 13 and 14), wherein the arcuate end 98 is radially spaced from the fork in its extended position by a distance greater than "d."

The arcuate end 98 of the pressure application device 94 is pressed against the food strip 12 by the spring-load 104 during at least a portion of the coiling of the food strip. Accordingly, the arcuate end 98 of the pressure application device 94 is moved from the first inner position (FIG. 9) to the second outer position (FIGS. 13 and 14) as the outer diameter of the coiled food strip 12 increases in outer diameter size during the coiling process. Correspondingly, once the coiled food item is removed from the fork 88, the arcuate end 98 of the pressure application device 94 moves from the second outer position to the first inner position by the force applied by the spring-load 104 to the bias attachment end 100 of the pressure application device.

Figure 12:
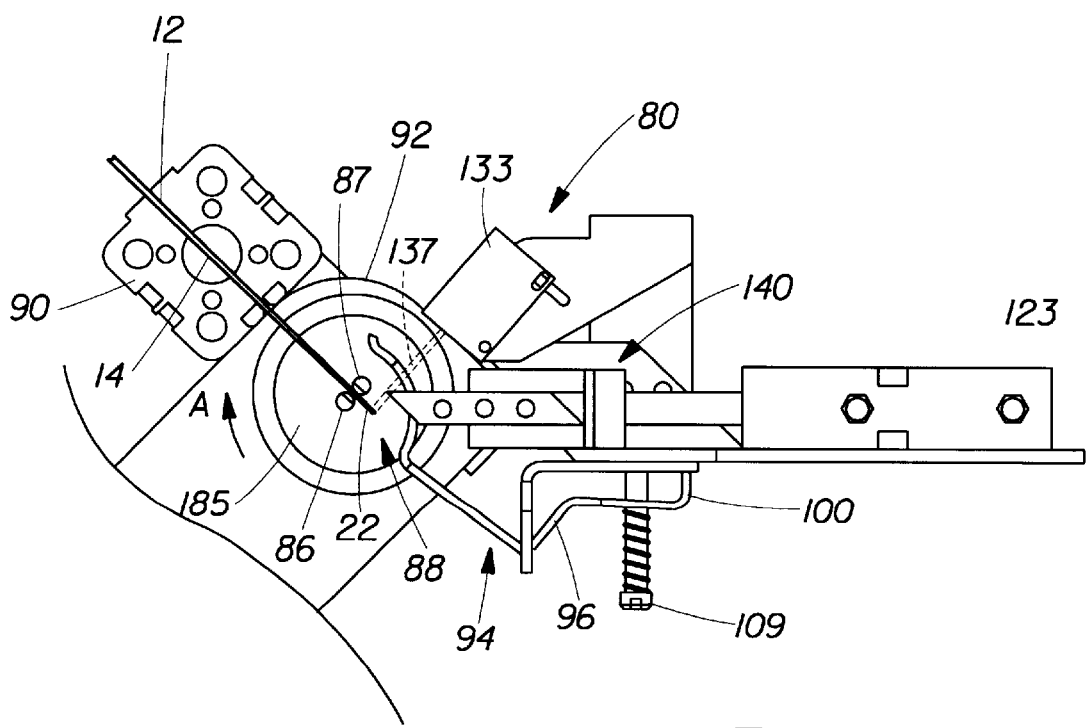
FIG. 12 is an elevated view of the mechanism of FIG. 9 receiving a strip of food material.

Turning to FIG. 12, in operation, the leading end 22 of a food strip 12 is fed by the inclined conveyor belt 82 (FIG. 8) between the legs 86, 87 of the fork 88 while the fork is positioned in its first engaged position and being stationary with the legs located to allow the leading end 22 of the food item to be fed therebetween. Preferably, a sensor device 133 is provided for detecting when the leading end 22 of the food strip 22 has been fed between the legs 86,87 of the fork 88. In an embodiment, the sensor device 133 is a conventional laser sensor that emits a laser beam 137. When the strip 22 is fed between the fork legs 86,87, the laser beam 137 reflects off the strip and back to the sensor. The sensor detects the reflection and, as a result, provides for enabling the motor 90 to rotate the fork 88 about an axis parallel with the legs 86, 87.

Figure 13:
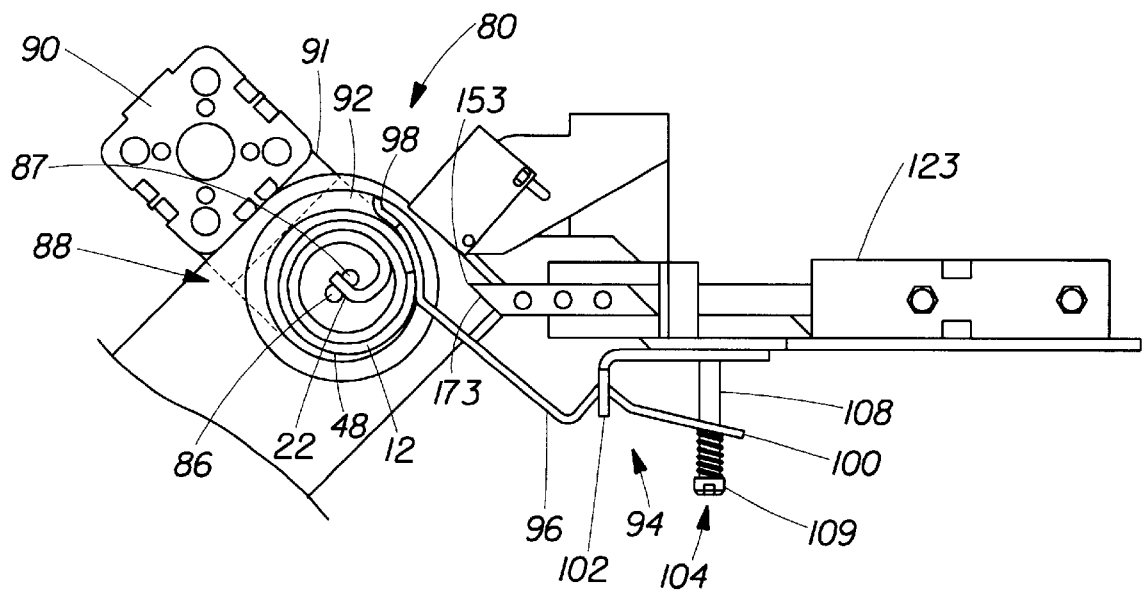
FIG. 13 is an elevated view of the mechanism of FIG. 12 after coiling the strip of food material.

With reference to FIG. 12, the fork 88 is preferably rotated in a clockwise direction as shown by arrow "A." As the fork 88 is rotated, it can be appreciated that the strip 12 of food 14 is rolled into a coil around its leading end 22 on, and around, the legs 86, 87 of the fork as shown in FIG. 13. In an embodiment, the motor 90 can rotate the fork 88 at adjustable speeds such that rotation of the fork is gradually decreased once the food strip 12 begins coiling about the fork. Likewise, if desired, the speed of conveyor belt 82 can be increased as the food strip coils about the fork 88.

Also, as the strip 12 of food 14 is rolled, the coil comes into contact against the pressure device's arcuate end 98 in its first, inner position. In its first inner position, the pressure device's arcuate end 98 places pressure on the rolling, coiled-up strip of food. Thus, the fork 88 acts as a rotating anvil, and with the pressure member's arcuate end 98, sandwiches the coiled-up strip of food therebetween.

Figure 10:
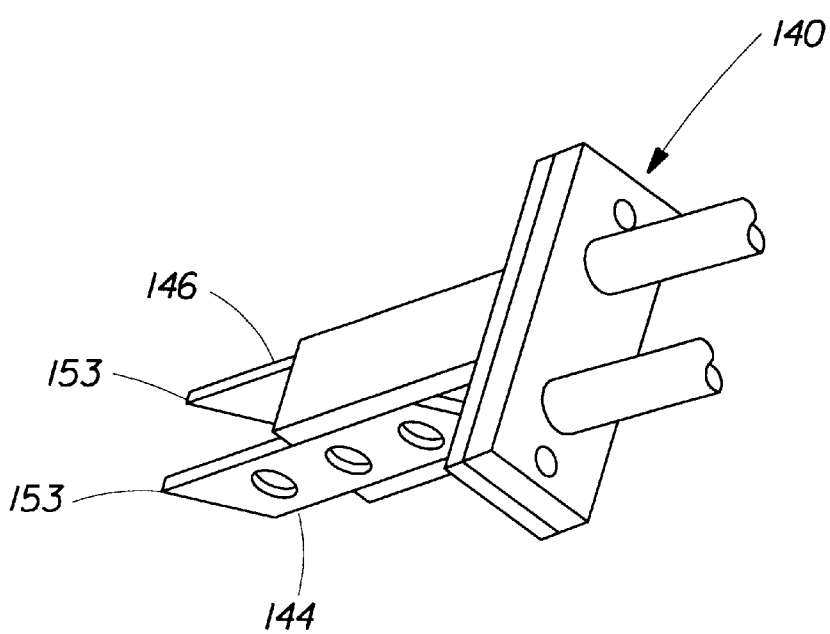
FIG. 10 is a perspective view of the tacking device associated with the coiling and tacking mechanism of FIG. 9.
Figure 14:
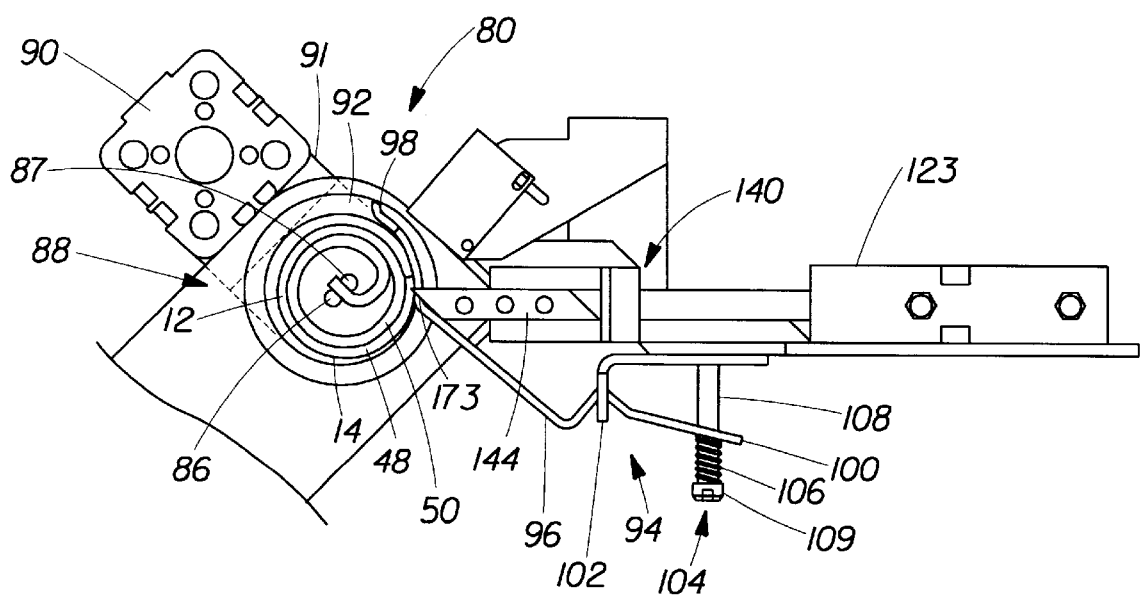
FIG. 14 is an elevated view of the mechanism of FIG. 13, but with the prongs of the tacking device injected into the coiled strip of food material.

Turning to FIG. 14, after the fork 88 has rotated the desired amount of times to completely coil the strip 12 of food 14, rotation of the fork is slowed to a complete stop. At that time, a tacking device 140 having a pair of prongs 144 and 146 (FIG. 10) maintained in spaced parallel relationship to each other are injected into the coiled strip 12. The prongs 144, 146 are connected to a double-action pneumatic cylinder 123 for injecting and, if desired, retracting the tips of the prongs 144, 146 from the coiled strip 12. Preferably, the prongs 144, 146 are a pair of spaced coplanar elongated strips fabricated of a metal or metal alloy with each prong having a tip 153 for injecting into the coiled food strip 12.

In an embodiment, the tips 153 of the prongs 144, 146 are injected into the outermost layer 48 of the coil to penetrate into the layer 50 adjoining the outermost layer. As the prongs 144, 146 are injected into the coil, a portion of the pressure application device's arcuate end 98 is positioned between the prongs while maintaining pressure against the coil to keep the coil from unraveling. Preferably, the terminal distal ends 173 of the prongs 144, 146 are blunted so that, by being injected into the coiled strip, the outer outermost layer 48 of the coil is pressed into, and thus becomes tacked to, the inner adjoining layer 50 of the coil.

Figure 15:
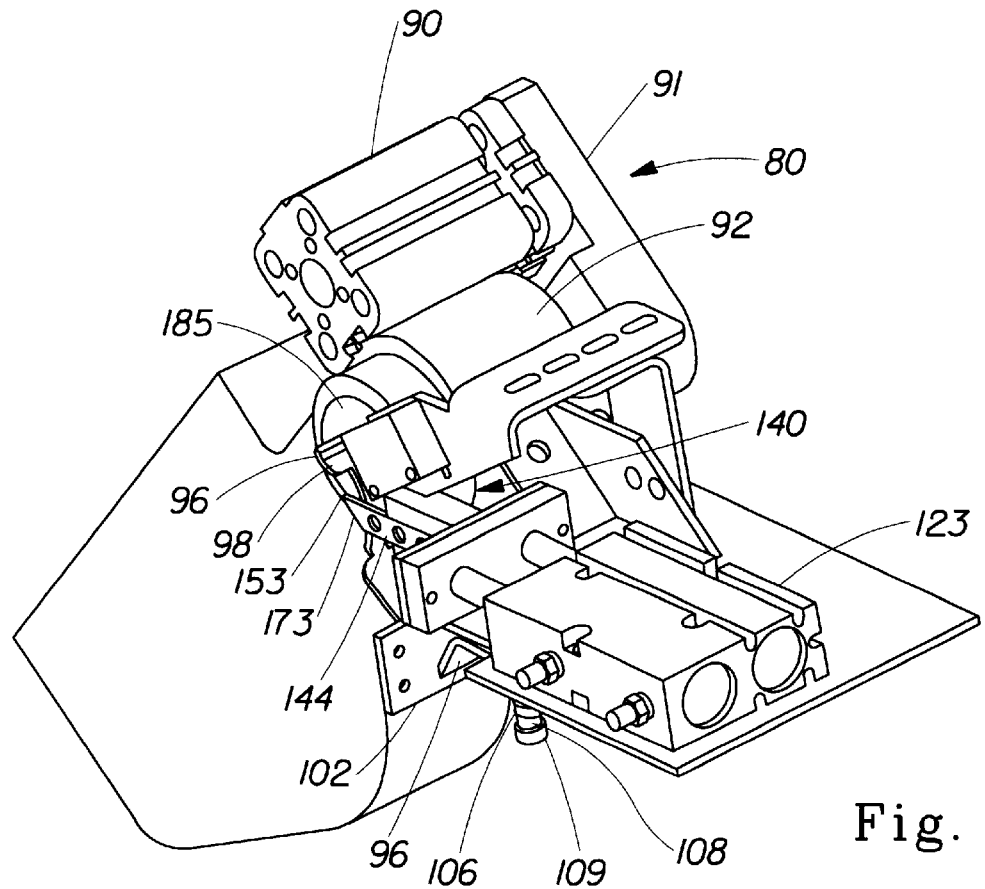
FIG. 15 is a perspective view of the mechanism of FIG. 14, but with the tacked coiled strip of food released from the mechanism; and, FIG. 16 is a partial plan view of the mechanism of FIG. 15 depicting the fork in the retracted, second position, to release the tacked coiled strip of food.
Figure 16:
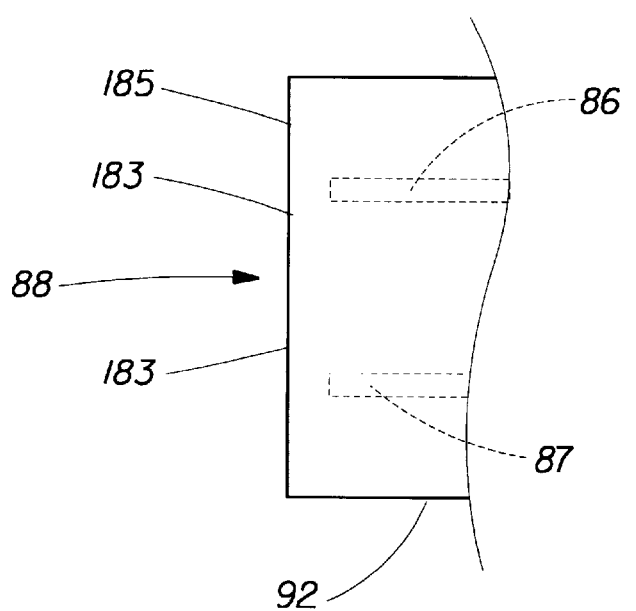

After the coiled strip 12 has been tacked, the fork 88 is axially slid from the coiled food item lo by reciprocating the fork transversely from its first, engaged position shown in FIGS. 9 and 11–14 to its second, disengaged position shown in FIGS. 15 and 16. The fork 88 is reciprocated by cylinder 92, with the individual tacked coiled strip of food 14 falling from the fork 88 as it is retracted. In an embodiment, the tacked coil of food falls onto a suitable collector means or removal conveyor, not shown.

As shown in FIG. 16, the legs 86, 87 of the fork 88 are retracted through a corresponding pair of apertures 183 in a rotatable stationarily mounted disk 185, with the coiled strip of food abutting the disk and axially sliding from the fork as the fork is transversely reciprocated into the apertures. After the fork 88 has reciprocated to its second, disengaged position as shown in FIGS. 15 and 16, so the coiled strip 12 of food 14 falls therefrom, the fork is moved back to its first, engaging position of FIG. 12 by cylinder 92, wherein legs 86 and 87 are positioned to accept the leading end of the next strip 12 of food 14. Before the next strip of food is coiled, prongs 144, 146 are retracted away from fork 88 by double-action pneumatic cylinder 123.

While the specific embodiments have been illustrated and described, numerous modifications come to mind without significantly departing from the spirit of the invention and the scope of protection is only limited by the scope of the accompanying Claims.

What is claimed is:

1. A method of making a tacked coiled food product comprising the steps of:

winding a strip of food material into a coil having an outer trailing end adjoining another portion of the strip;

injecting a prong into the coil about the outer trailing end to tack portions of the coil together; and retracting the prong from the tacked roll.

2. The method of claim 1 further comprising the step of extruding the food material to form the strip.

3. The method of claim 1 further comprising the step of directing the strip through a bath of edible oil to maintain acid within the strip.

4. The method of claim 1 further comprising the step of directing the strip through a cooling tunnel to cool the strip.

5. The method of claim 1 further comprising the step of adhering a granular edible coating to the strip.

6. The method of claim 1 further comprising the step of cutting the strip to define the outer trailing end.

7. The method of claim 1 further comprising the step of heating the prong.

8. The method of claim 1 further comprising the step of tacking at least two layers of the coil together by applying pressure.

9. The method of claim 1 further comprising the step of tacking at least two layers of the coil together by applying heat.

10. The method of claim 1 further comprising the step of applying pressure to an outer surface of the coil during the step of winding the strip.

11. The method of claim 1 further comprising the step of feeding a leading end of the strip between legs of a fork before the step of winding the strip.

12. The method of claim 11 further comprising the step of detecting when the leading end of the strip is fed between the legs of the fork.

13. The method of claim 12 further comprising the step of providing a laser sensor for detecting the leading end of the strip.

14. The method of claim 12 further comprising the step of rotating the fork to wind the strip about the fork.

15. The method of claim 14 further comprising the step of retracting the fork to release the coil from the fork.

* * * * *